Aug. 29, 1944.  C. H. HUENLICH  2,356,851
PHONOGRAPHIC TRANSLATING DEVICE
Filed July 2, 1941
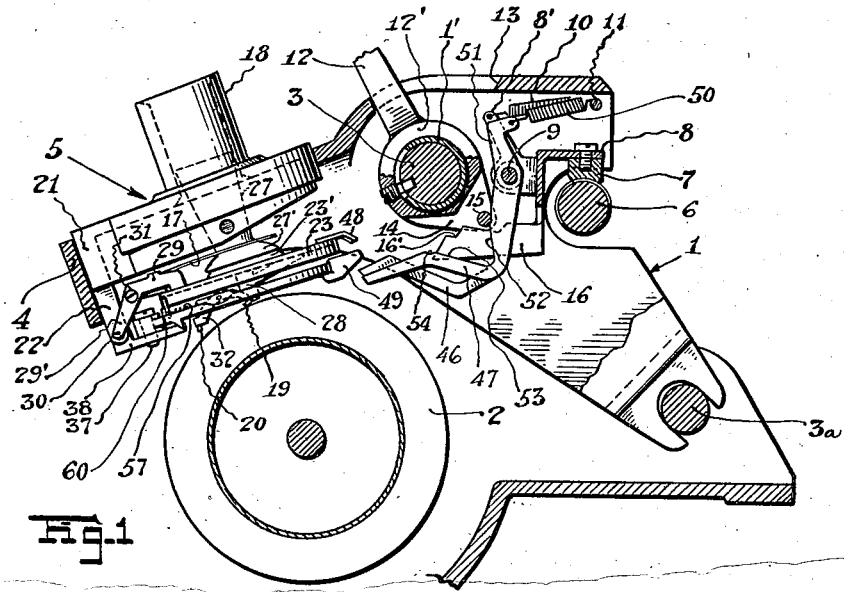
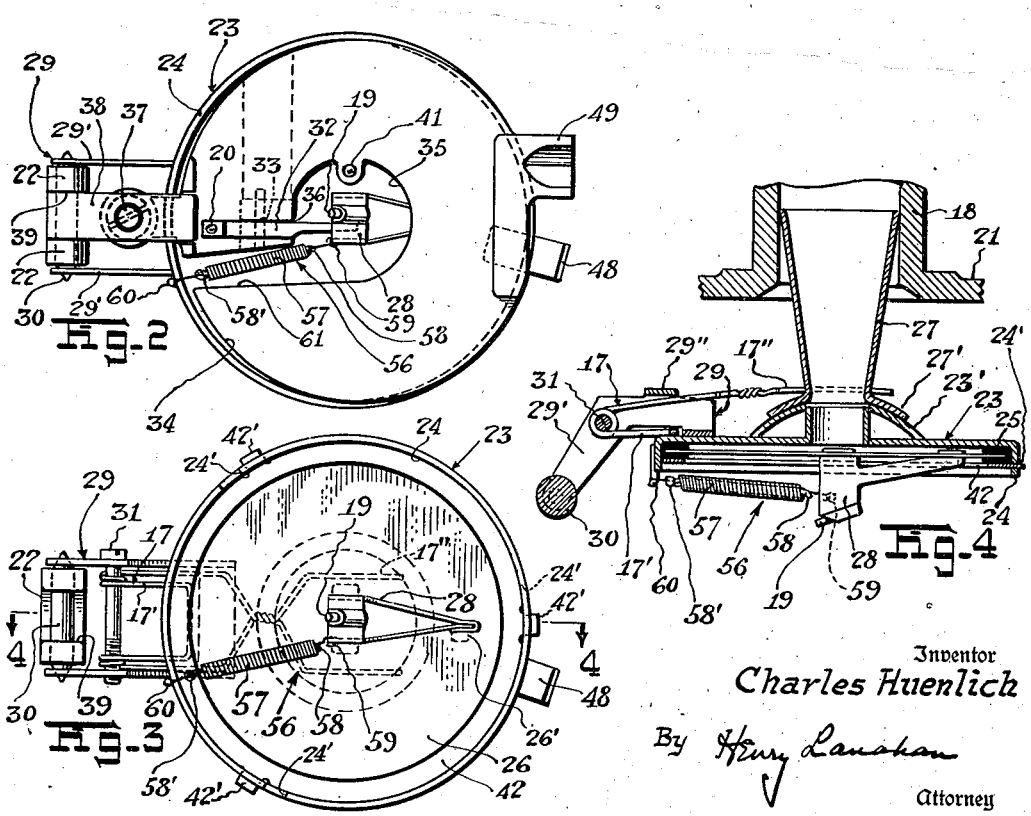
Inventor
Charles Huenlich
By Henry Lanahan
Attorney Patented Aug. 29, 1944

2,356,851

UNITED STATES PATENT OFFICE 2,356,851

PHONOGRAPHIC TRANSLATING DEVICE

Charles Huenlich, Bloomfield, N. J., assignor to Thomas A. Edison, Incorporated, West Orange, N. J., a corporation of New Jersey Application July 2, 1941, Serial No. 400,790

5 Claims. (Cl. 274—17)

This invention relates to improved translating devices for phonographs, and is in particular concerned with improvements in such devices for stabilizing and otherwise improving their operation as in respect of sensitivity, volume range and fidelity of response.

My invention has particular utility, and is herein illustrated and described in connection with a translating device of the acoustical type, but it will be understood that no unnecessary limitation of my invention to translating devices of this type is intended.

In certain instances when the vibration systems of phonographic translating devices are designed for improved fidelity and sensitivity, there are encountered undesirable effects in the operation of such systems which impair the overall operation of the devices and detract from their usefulness. These undesirable effects typically arise from an accentuated sensitivity of the devices to certain bands of frequencies, particularly to oscillations or excitations within the lower audio and sub-audio spectrums. The net results of these undesired effects are to give the devices a non-linear response in respect of frequency and volume level, and a tendency to instability through sustained and/or extraneous vibrations of the systems, other than their normal modes of vibration, in response to excitations arising from external influences such as from mechanical shock and from the action of the dynamic force of the moving record on the vibration systems.

In an acoustical-type phonographic translating device, for example, the vibration system comprises a diaphragm and a stylus mounted on this diaphragm and arranged for coaction with the surface of the moving record, the diaphragm being actuated directly by sound waves during recording and by the record through the stylus during reproducing. In these devices the characteristics of the diaphragm (for instance, its stiffness and permissible modes of vibration) are all-important factors in determining the sensitivity and fidelity of response of the devices. There are however practical considerations which set definite limits on the design of the diaphragm, for this diaphragm is usually required to support the residual weight or force which the device exerts on the record and to hold the stylus firmly enough to resist the force applied thereto by the moving record, i. e., the force exerted principally along the traversed record surface and hereinabove referred to as "the dynamic force of the moving record." When the diaphragm is made sufficiently stiff to fulfill these practical requirements, the sensitivity and fidelity of response of the device is restricted. When, however, the diaphragm is made effectively more flexible, by changing the thickness and/or mounting thereof, it is found that the response of the unit is unduly accentuated in the lower frequency range and that certain other undesirable effects are encountered such as are above noted. These undesirable effects—which may manifest themselves not only in the accentuation of certain frequencies but in the generation of blasting and singing sounds, in "jump-outs" of the stylus from the record during recording and in certain tracking difficulties during reproducing—arise, in particular, in those translating devices wherein, for expediency in structural design, the stylus is mounted at a considerable distance from the diaphragm.

It is an object of my invention to provide a phonographic translating device having an improved response and wherein such objectionable effects as are above mentioned are eliminated.

It is another object to provide a stable phonographic translating device of the acoustical type which is capable of translating efficiently the sibilant higher-frequency speech sounds.

It is another object to fulfill the above-stated objectives by simple structure and, in particular, in conventional translating devices by making only minor structural changes therein.

It is another object to produce an advantageous frequency discriminating action in phonographic translating devices by novel mechanical means.

It is another object to restrain the active vibratable element of a translating device from undesirable modes of vibration such as may be induced by mechanical shock and by the action of the dynamic force of the moving record on the stylus.

A further object is to fulfill the desired objectives above stated in both recorders and reproducers and particularly to accomplish this by unitary means in a recorder and reproducer of the combined type.

A yet further object of my invention it to provide structural improvements in phonographic translating devices which facilitate the assembling and servicing of the devices.

Other and allied objects will more fully appear from the following description and the appended claims.

In the description of my invention reference is had to the accompanying drawing, of which:

Figure 1 is a fractional vertical sectional view of a phonograph in which my invention is incorporated;

Figure 2 is a partial bottom view, to enlarged scale, of the translating device of Figure 1, showing details of my invention;

Figure 3 is a view similar to Figure 2 but wherein certain lower parts of the translating device are removed; and Figure 4 is a fractional sectional view taken vertically through the translating device substantially on the line 4—4 of Figure 3.

Reference being had to Figure 1 there will be seen a portion of a commercial phonograph or dictating machine comprising a carriage 1 which is movable along a record 2 on a pair of rods 3 and 3a, the carriage sliding directly on the rod 3a and having a sleeve 1' which slidably embraces the rod 3. The carriage is provided with an apertured arm 4 extending forwardly over the record and carrying a phonographic translating device 5 which is arranged for coaction with the record. A relative progressive movement between the translating device and record is effected by a rotation of the record and a concomitant feeding of the carriage therealong. The feeding means for the carriage comprises a rotatable feed screw 6 which extends along the path of the carriage. Connection of the carriage to the feed screw is made by means of a feed nut 7 carried by an angle iron 8 which is pivoted on a rod 9 to the carriage. During operation of the machine the feed screw 6 and record 2 are rotated concurrently as by a suitable drive means not herein necessary to show.

The feed nut 7 is biased into engagement with the feed screw 6 but is movable at will out of engagement with the feed screw to free the carriage for manual movement along the record. The biasing of the feed nut is effected by means of a tension spring 10 connected between an arm 8' on the angle iron 8 and a pin 11 on the carriage. The disengagement of the feed nut from the feed screw is controlled by a lever 12 extending upwardly through an opening 13 in the top of the carriage and having a hub 12' which embraces the sleeve 1'. On the hub of the lever 12 there is a projection 14 carrying a cross pin 15 which overlies a forwardly extending arm 16 on the angle iron 8. When the lever 12 is in a forward position, as shown in Figure 1, as well as in its most rearward position, the pin 15 is free of the arm 16 and the feed nut 7 is then held in engagement with the feed screw 6 by the spring 10. However, as the lever 12 is moved from either its forward or rearward positions into a central position the arm 16 is cammed downwardly by the pin 15 so as to disengage the feed nut from the feed screw. This central position of the lever 12 is defined by the engagement of the pin 15 with a notch 16' on the arm 16.

The translating device 5 is herein illustrated as being a combined or unitary arrangement of recorder and reproducer of the acoustical type. This device has a recorder stylus 19 and a reproducer stylus 20 which are selectively movable into contact with the record 2 to condition the device for recording or reproducing. When the translating device is conditioned for recording it is adapted to receive sound waves by way of a tubular neck 18, provided on the device, and to impart an undulating movement to the recorder stylus 19 in accordance with the received sound waves, this undulating stylus movement being registered as groove modulations in the moving record 2. When the device is conditioned for reproducing, it is adapted to generate sound waves in correspondence with the undulating movements which are imparted to the reproducer stylus 20 as the stylus progressively tracks a modulated groove on the record.

This translating device has a frame 21, in the form of an inverted cup, which is provided at the center with the upstanding tubular neck 18 abovementioned and at its front with a downwardly extending lug 22. Positioned below the frame 21 is a sound-box including a circular casing 23 which is provided with an apertured dome 23' at the center thereof and with a turned down flange 24 at its rim. This casing is pivoted to the lug 22, for movement towards and away from the record, by means of a bracket 29 secured as by welding to the casing and provided with a pair of spring arms 29' which engage the conical ends of a cross pin 30 carried by the lug. The spring arms 29' are biased away from each other but the spacing between the arms, and therefore the pressure of the arms against the conical ends of the pin 30, is controlled by an adjusting screw 31 which extends freely through one of the arms and threads into the other.

The casing 23 is sound coupled to the neck 18 by means of a flared tube 27 which slidably fits the inner wall surface of the neck 18 at the top thereof and which has a spherical flange 27' at the bottom thereof fitting the dome 23' and forming a universal joint therewith. The flange 27' is held in engagement with the dome by the weight of the tube and is prevented from being displaced substantially from the dome by a limit stop comprising a wire spring 17 coiled about the adjusting screw 31. This spring has a central U-shaped portion 17' which bears down against the top of the casing 23 and has its two end portions 17" extending rearwardly and held, by a cross bar 29" on the bracket 29, in positions just slightly above the flange 27'. This type of spring for keeping the tube 27 in place will be seen to have the advantage of permitting the tube to be easily assembled in the device and, when assembled, to be freely universally moved in relation to the casing, thus permitting an unimpeded tracking of the device with the moving record.

The bottom of the casing 23 is closed by a vibratable member or diaphragm 26 which constitutes the active vibration element of the translating device. This diaphagm is held to the casing by a gasket 25 which embraces the rim of the diaphragm and fits the flange 24 (see Fig. 4). The diaphragm is held in place by an annular member 42 which bears against the gasket 25, the member 42 being removably secured to the casing 23 by means of three lugs 42' on the member which engage slots 24' in the flange 24, two of these slots having however portions thereof open through the bottom of the flange, as is indicated in Figure 3, to permit the member to be put in place as in a manner well known for the type of securing means here explained. Extending down from the diaphragm is a bridge or stirrup 28 which is anchored to the diaphragm at the center thereof and also at a place 26' near the rim thereof; mounted on the bottom of this stirrup is the recorder stylus 19 hereinbefore referred to. By this arrangement, sound waves which are conducted through the neck 18 and tube 27 into the casing 23 will actuate the diaphragm 26 and set the recorder stylus in vibration, the normal or desirable modes of vibration of the diaphragm being such as to move the stylus towards and away from the record whereby to produce a recordation on the record of the hill-and-dale type.

The reproducer stylus 20 is mounted on a lever 32 which is pivoted at 33 to a weight 34. This weight serves to bias the reproducer stylus against the record when the translating device is conditioned for reproducing. The weight, which is in the shape of a circular disk, has a central opening 35 through which the stirrup 28 extends when the device is conditioned for recording as is hereinafter explained, and has a slot 36 extending from the opening 35 through which the stylus lever 32 passes, the lever terminating at a point within the stirrup 28 as is shown in Figures 1 and 2. The weight 34 is pivoted by a shoulder screw 37 to an arm 38 which in turn is pivoted on the pin 30 centrally thereof, the arm passing through a slot 39 provided in the lower end portion of the lug 22. By this pivoting arrangement, the weight is mounted for both radial and lateral movement relative to the record, the radial movement being about the pin 30 and the lateral movement about the screw 37.

The casing 23 and weight 34 are biased towards the record by gravity. When the translating device is conditioned for recording, both of these units are permitted to rest on the record, the casing being supported through the recorder stylus 19, the stirrup 28 (which now extends through the opening 35) and the diaphragm 26, and the weight 34 being supported through an advance ball 41 provided thereon. Thus both the casing and biasing weight are permitted to "float" on the record, the weight however playing no part in recording.

When the translating device is conditioned for reproducing the casing 23 is retained in a raised position and the biasing weight is floated in an intermediate position wherein it is held by the lever 32, one end of the lever being supported by the record through the reproducer stylus 20 and the other end being supported by the stirrup 28.

When both the casing 23 and biasing weight 34 are maintained in raised position, both the recorder stylus 19 and reproducer stylus 20 are held out of operative relationship (i. e., out of contact) with the record, to place the translating device in an inoperative condition.

The means for selectively placing the translating device 5 into inoperative condition and respective operative conditions for recording and reproducing comprises a pair of lifting fingers 46 and 47 respectively adapted to contact a tab 48 on the casing 23 and a lug 49 on the biasing weight 34 to hold the casing and biasing weight in raised position. The fingers 46 and 47 are pivoted on the rod 9 and are each biased upwardly by means of tension springs connected between the rod 11 and short arms extending upwardly from the pivoting axis of the fingers, the spring and arm which form the biasing means for the finger 47 being represented as 50 and 51 respectively. The positioning of the fingers is, however, controlled by the lever 12. When the lever 12 is in a forward position both fingers are held in downward position by the pin 15, and the casing 23 and biasing weight 34 then rest on the record to effect the recording condition of the translating device. As the lever 12 is moved into its central position the pin 15 slides along cam faces 52 on the fingers to cause each of the fingers to move upwardly in response to their biasing, thereby placing both the casing 23 and biasing weight 34 in raised position to effect the inoperative condition of the translating device; and as the lever 12 is moved into its rearward position the pin 15 moves free of the finger 46 but encounters a cam face 53 on the finger 47 to move this finger downwardly, thereby causing the casing 23 to be retained in raised position but permitting the biasing weight 34 to move downwardly into a lower position to effect the reproducing condition of the translating device. The lever 12 may be releasably held in its rearward position by the engagement of the pin 15 with a notch 54 provided in the finger 47.

It has been common practice in accoutical-type translating devices such as are used in commercial dictating machines, to support the stylus on the sound box, for vibration, solely through the medium of the diaphragm as in the manner hereinabove described. This manner of vibratably supporting the stylus has, however, required that the diaphragm be made sufficiently stiff to restrict the stylus against undesirable or extraneous vibration such, for instance, as lateral or transverse vibration along the traversed surface of the record; when the stylus is mounted at a considerable distance from the diaphragm, as in the present case to permit the biasing weight to be interposed between the stylus and the diaphragm, the required degree of stiffness of the diaphragm is increased. Obviously, a diaphragm having the requisite stiffness for the purpose just stated will also have a high degree of stiffness in its desirable mode of vibration normal to the record, and consequently the sensitivity and frequency range of response of the device are adversely affected. Should, however, the diaphragm be designed to have a greater degree of flexibility and other things be left the same, the sensitivity and frequency range of response may be improved. These improvements are however substantially counterbalanced by an undue response of the device to actuations in the lower frequency spectrum tending, because of the usually greater energy in this spectrum, to cause the recordation and reproduction of rumbling sounds and even to cause jump-outs of the stylus from the record during recording; by an instable action arising as from an appreciable responsiveness of the device to forces applied to the stylus in lateral directions along the traversed surface of the moving record, which forces may arise from the dynamic action of the moving record on the stylus, from mechanical vibration of the machine, etc.; and by a tendency of the device to respond explosively to higher level sounds or other actuating forces, thus effectively reducing the volume range of response of the device.

In accordance with the present invention, a more flexible diaphragm may be used (for instance, one reduced in thickness) and the above-mentioned undesirable effects arising from such more flexible diaphragm are eliminated while yet an improved sensitivity and an improved frequency and volumn range of response are realized. These desirable results are attained by a simple stabilizing or impedance means effective on the stylus in the direction transverse to its normal or useful direction of vibration and which may be conveniently interposed between the stirrup 28 and the rim of the casing 23. This impedance means, which appears herein as the element 56, comprises a helical tension spring 57 which is damped by a cord 58 that is threaded through the spring and treated with a suitable wax such as paraffin. Suitably to prevent a displacement of the cord lengthwise of the spring, the cord is first threaded once through the spring, looped around one projecting end of the spring and then threaded back on itself through the spring while the loose ends of the cord are secured to the other projecting end of the spring by sealing wax 58', the cord being so chosen that the two thicknesses thereof will substantially fill the interior space of the spring. The spring is hooked at one end, as at 59, to the stirrup 28 and at the other end on a pin 60 welded to the flange 24 of the casing, and is restrained from a vibration of its own by the damping effect of the cord 58. Preferably, this impedance means is applied at least substantially in the direction of movement of the record in relation to the stylus, to oppose the dynamic force exerted on the stylus by the moving record, as is shown in the figures. To clear the spring 57 when the translating device is conditioned for recording, the biasing weight 34 is provided with a wide slit 61 extending therethrough from the rim to the opening 35.

It is found that a particular effect of the impedance means 56 on the translating device is to reduce the accentuated response of the device in the lower frequency spectrum—as typically from about 900 C. P. S. on down—and to improve the response of the device in the higher frequency spectrum. Thus the impedance means, by its frequency-discriminating action, operates to stabilize the action of the translating device and at the same time to render it more efficient in translating the sibilant and other higher frequency speech sounds.

The particular manner in which the impedance means 56 operates to produce the stabilizing, frequency-discriminating and other desirable effects abovementioned appears to follow from a damped torsional biasing of the diaphragm which favorably alters its useful modes of vibration while stiffening the diaphragm against undesirable modes. While this impedance means as here applied to the translating device has particular utility in the present embodiment when the same is utilized as a recorder, because of the then direct coaction between the vibration system of the device and the record, it has also utility in improving the operation of the device in the respects hereinabove considered when the device is utilized as a reproducer.

Although I have herein shown the application to the diaphragm of both damping and torsional biasing (or biasing transverse to the direction of the useful modes of vibration of the stylus) the damping and biasing are beneficial separately of one another and no unnecessary limitation to the application of both simultaneously is intended. Furthermore, it will be understood that my invention is not limited to the specific embodiment herein disclosed as this embodiment is subject to many changes and modifications without departure from the scope of my invention, which I undertake to express according to the following claims.

I claim:

1. In a phonographic translating device including a frame and adapted to coact with the surface of a moving record: the combination of a resilient vibratable member constituting the active vibration element of said device and characterized as having desirable and undesirable modes of vibration; a record-cooperating stylus; a stylus mounting rigidly securing the stylus to said vibratable member; a holder for said vibratable member movably mounted on said frame to permit the stylus to track the record surface; and resilient means connected between said holder and stylus mounting for applying a yieldable biasing force onto said vibratable member to hold the member in a constrained condition and restrain the same from undesirable vibrations.

2. In a phonographic translating device adapted to coact with the surface of a moving record: the combination of a resilient vibratable member constituting the active vibration element of said device; a holder movably supporting said member for vibration and for coaction with the moving record; and damped yieldable means acting on said vibratable member to exert a biasing force thereon in a direction transverse to that of the normal vibration of the member whereby to hold the member in a constrained condition.

3. In a phonographic translating device including a frame and adapted to coact with the surface of a moving record: the combination of a resilient vibratable member constituting the active vibration element of said device; a record-cooperating stylus; a stylus mounting securing the stylus to said vibratable member; a holder for said vibratable member movably mounted on said frame to permit the stylus to track the record surface; a spring interposed between said holder and stylus mounting for exerting a biasing force on said vibratable member; and damping means applied to said spring.

4. In a phonographic translating device: the combination of a vibratable member constituting the active vibration element of said device; a stylus; a mounting rigidly securing said stylus to said member; a holder movably supporting said member to permit said stylus to track the surface of a moving record; a coil spring interposed between said mounting and said holder for applying a bias to said mounting in a direction substantially parallel to the traversed record surface; and damping means extending axially through and effective on said coil spring.

5. In an acoustical-type phonographic translating device including a diaphragm, a holder supporting said diaphragm for movement relative to the surface of a moving record and a stylus mounted on and supported by an intermediate portion of said diaphragm, said stylus being adapted to coact with said moving record surface: the combination of spring means operatively interposed between said stylus and holder for exerting a yieldable biasing force on said diaphragm whereby to place the diaphragm in a constrained condition and render the same substantially unresponsive to variations in the force applied thereto by the moving record through said stylus; and damping means applied to and effective on said spring means.

CHARLES HUENLICH.